US008738872B2

(12) United States Patent
Liu

(10) Patent No.: US 8,738,872 B2
(45) Date of Patent: May 27, 2014

(54) METHODS FOR MIGRATING DATA IN A SERVER THAT REMAINS SUBSTANTIALLY AVAILABLE FOR USE DURING SUCH MIGRATION

(76) Inventor: Peter Chi-Hsiung Liu, Paramus, NJ (US)

( * ) Notice: Subject to any disclaimer, the term of this patent is extended or adjusted under 35 U.S.C. 154(b) by 44 days.

(21) Appl. No.: 12/753,626

(22) Filed: Apr. 2, 2010

(65) Prior Publication Data
US 2010/0257328 A1 Oct. 7, 2010

Related U.S. Application Data

(60) Provisional application No. 61/166,461, filed on Apr. 3, 2009.

(51) Int. Cl.
G06F 12/06 (2006.01)
G06F 11/14 (2006.01)
G06F 12/02 (2006.01)
G06F 11/20 (2006.01)

(52) U.S. Cl.
CPC ........ G06F 11/1456 (2013.01); G06F 11/2074 (2013.01); G06F 11/2082 (2013.01); G06F 12/0238 (2013.01); G06F 2212/261 (2013.01)
USPC .................................. 711/162; 711/E12.103

(58) Field of Classification Search
CPC . G06F 13/105; G06F 13/362; G06F 13/4063; G06F 12/0238; G06F 12/02; G06F 2212/261; G06F 2212/263; G06F 11/1456; G06F 11/1451; G06F 11/2071; G06F 11/2074
USPC ........................................... 711/162, E12.103
See application file for complete search history.

(56) References Cited

U.S. PATENT DOCUMENTS

| 6,654,830 | B1 * | 11/2003 | Taylor et al. | 710/74 |
| 7,640,408 | B1 * | 12/2009 | Halligan et al. | 711/162 |
| 8,117,413 | B2 * | 2/2012 | Pace | 711/165 |
| 2002/0004890 | A1 * | 1/2002 | Ofek et al. | 711/161 |
| 2005/0278492 | A1 * | 12/2005 | Stakutis et al. | 711/161 |
| 2007/0067588 | A1 * | 3/2007 | Kano et al. | 711/162 |
| 2007/0239803 | A1 * | 10/2007 | Mimatsu | 707/204 |
| 2007/0271434 | A1 * | 11/2007 | Kawamura et al. | 711/165 |
| 2009/0037679 | A1 * | 2/2009 | Kaushik et al. | 711/162 |
| 2010/0049917 | A1 * | 2/2010 | Kono et al. | 711/114 |

* cited by examiner

Primary Examiner — Hal Schnee
(74) Attorney, Agent, or Firm — Hughes Hubbard & Reed LLP

(57) ABSTRACT

Methods and software for "hot migration" of data an original storage unit for a target system to destination storage unit. In one embodiment, a virtual storage device is provided, having a control block mapped to both the original storage unit, as well as to the destination storage unit. The target system is stopped, the virtual storage device is substituted for the original storage unit, and the target system is restarted. The virtual storage device directs requests to the destination storage unit, and fulfills read requests from whichever of the two storage units has a valid copy of data requested (depending, e.g., on whether the data is as yet unchanged, has been re-written, or has been copied, during the migration process). Unchanged data blocks are copies from the original storage unit to the destination storage unit. The target system is stopped, the virtual storage device is disconnected from the target system, and the destination storage unit is connected in its place. Software may also be provided to automate these processes.

14 Claims, 4 Drawing Sheets

METHODS FOR MIGRATING DATA IN A SERVER THAT REMAINS SUBSTANTIALLY AVAILABLE FOR USE DURING SUCH MIGRATION

CROSS-REFERENCE TO RELATED APPLICATIONS

This application claims the benefit of U.S. Provisional Application No. 61/166,461, filed Apr. 3, 2009, the entire disclosure of which is hereby incorporated by reference.

BACKGROUND OF THE INVENTION

1. Field of the Invention

The invention is in the fields of data storage and data protection, and more particularly concerns methods for migrating data from one storage unit to another on a system, while the system remains substantially available for read and write operations.

2. Description of the Related Art

Data processing systems rely on increasingly large data stores and data storage devices. Databases and email servers, among others, are good examples of such systems. From time-to-time, it is necessary to replace a storage device on such systems, for example, because the device is beginning to generate errors, is growing obsolete, is too slow, is too small, or for some other reason. The process for switching out an old storage device for a new one is often referred to as "disk migration". A problem with disk migration as currently practiced is that it often entails a substantial period of down time (many hours for large storage devices) in order to copy the data being migrated. In high-availability systems, such down time may be highly inconvenient or entirely unacceptable.

Conventionally, data is migrated from a data storage device to a replacement device by shutting down the system in question (e.g., database or email server), copying the data on the old device to the replacement device, attaching the replacement device to the system in place of the original device, and restarting the system. In such a procedure, the server cannot simply be left running while the copy is being made, because at some point in the copying procedure, the server may change data that has already been copied, thereby resulting in divergence between the data on the original and replacement storage devices. Conventionally, therefore, copying a volume while it is in use in production is likely to result in corrupted data.

Accordingly, in a conventional migration process, the server must be stopped, and therefore unavailable, the entire time that the data is being migrated. With large storage devices, such an operation may take hours, resulting in substantial downtime.

RAID storage provides limited relief from having to go offline in order to replace a storage device, but the migration must in that case be to a storage device that will function compatibly as part of the RAID array, greatly limiting migration options if downtime must be avoided. RAID is therefore more properly viewed as a safeguard against component failure, rather than as a migration solution.

Migration downtime could also be avoided in an environment that provided continuous mirroring, but such an approach would be prohibitively expensive in most typical applications.

Recent Storage Area Network (SAN) systems, such as those from NetApp®, sometimes provide the ability to "clone" a running storage device to a virtual drive. While this can provide a temporary way to migrate off of a device, it is not generally a long-term solution because of the performance and other limitations of virtual storage. In most cases, a temporary migration performed by cloning will eventually have to be re-migrated to nonvirtual storage, again raising the original issue of down time. While this can help shift the down time period to a more operationally acceptable time period, the cloning approach may not solve the problem in the case of high-availability systems that cannot accommodate the eventual down time necessitated by such a procedure. Similarly, IBM® provides a SAN Volume Controller (SVC) product, which can be used to reallocate storage. However, when used in this manner, the SVC hardware must remain attached to the target system, which is a substantial cost and operational disadvantage.

Storage devices and facilities are often aggregated or otherwise managed by Logical Volume Managers, and/or subdivided by partitioning and other methods. Accordingly, references herein to "storage units", "storage devices", "disks", or "volumes" should be understood to encompass logical volumes, partitions, remotely-mounted drives, storage arrays, virtual drives, loopback devices and the like, as well as other physical types of storage, such as solid state and any other devices capable of storing data. The term "storage unit" will be used herein as a general reference to any such storage device or arrangement.

SUMMARY OF THE INVENTION

It is an object of the present invention to provide a practical and reliable "hot migration" method, that is, a method for data storage migration that can be applied to a wide variety of both original and destination storage units and performed on a system while it remains substantially available for operations.

It is a further object of the invention to be able to perform such a migration of a data storage unit without having to install nonstandard software on the system to be migrated, or leaving the system connected to any nonstandard hardware.

In one embodiment, the invention provides a method for performing migration to a destination storage unit, of an original storage unit, for a target system that remains substantially available for read and write operations while the migration is being effected. In this embodiment, a virtual storage device of at least the same size as the original storage unit is created. The control block area of the virtual storage device is mapped to both the original storage unit, as well as to the destination storage unit, again of at least the same size as the original storage unit. In a relatively quick operation, the target system is stopped, the virtual storage device is substituted for the original storage unit, and the target system is restarted. The control logic of the storage virtualization server is adapted, with a suitable internal driver or otherwise, so that while in use, write requests are directed to the destination storage unit, and read requests are directed to whichever of the two storage units has a valid copy of data requested (depending, e.g., on whether the data is as yet unchanged, has been re-written, or has been copied, during the migration process). In another process, the allocated and unchanged data from the original storage unit is copied to the destination storage unit. When the copying process is complete, in another quick operation, the target system is stopped, the virtual storage device is disconnected from the target system and the destination storage unit is connected in its place, and the target system restarted, thereby completing the migration. This approach may also be adapted and generalized to work with nonlocal original storage units, such as SAN volumes, to handle multiple drives, etc.

In another aspect, the invention concerns software to adapt a storage virtualization server to perform the operations described above, preferably in the form of a driver for such storage virtualization server. A user can then install such software and conveniently perform the above-described operations, with the assistance of the software.

Other aspects and advantages of the invention will be apparent from the accompanying drawings, and the detailed description that follows.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF PREFERRED EMBODIMENTS

The following is a detailed description of certain embodiments of the invention chosen to provide illustrative examples of how it may preferably be implemented. The scope of the invention is not limited to the specific embodiments described in the following detailed description, nor is it limited by any specific implementation, embodiment or characterization depicted in the accompanying drawings or stated or described in the invention summary or the abstract. In addition, it should be noted that this disclosure describes a number of processing methods each comprising a plurality of steps. Nothing contained in this written description should be understood to imply any necessary order of performing method steps described herein, except as required by express claim language stating that listed steps must be performed in a particular order.

Figure 1:
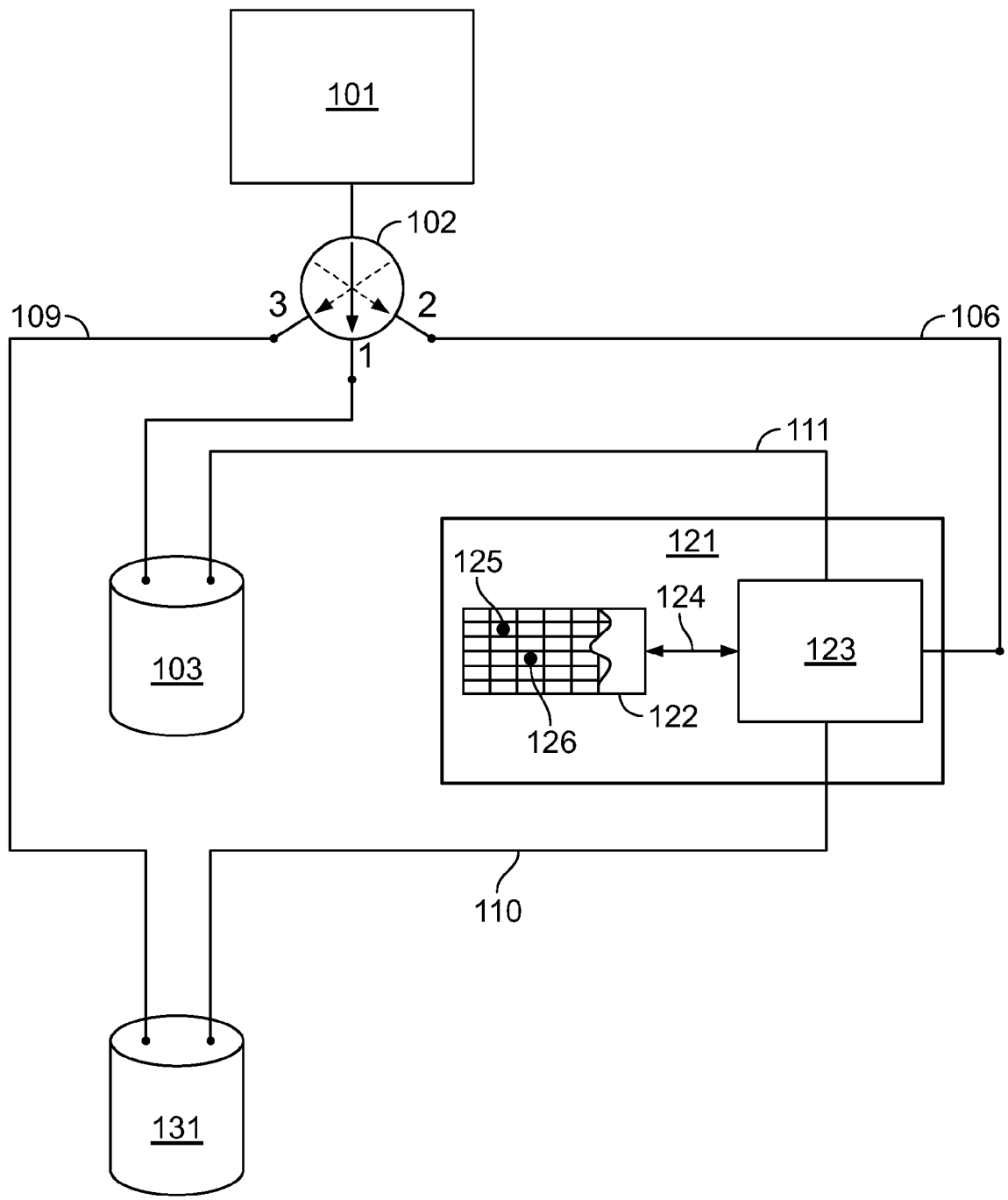
FIG. 1 is a block diagram schematically illustrating a system in which data is to be migrated from one storage device to another.
Figure 2A:
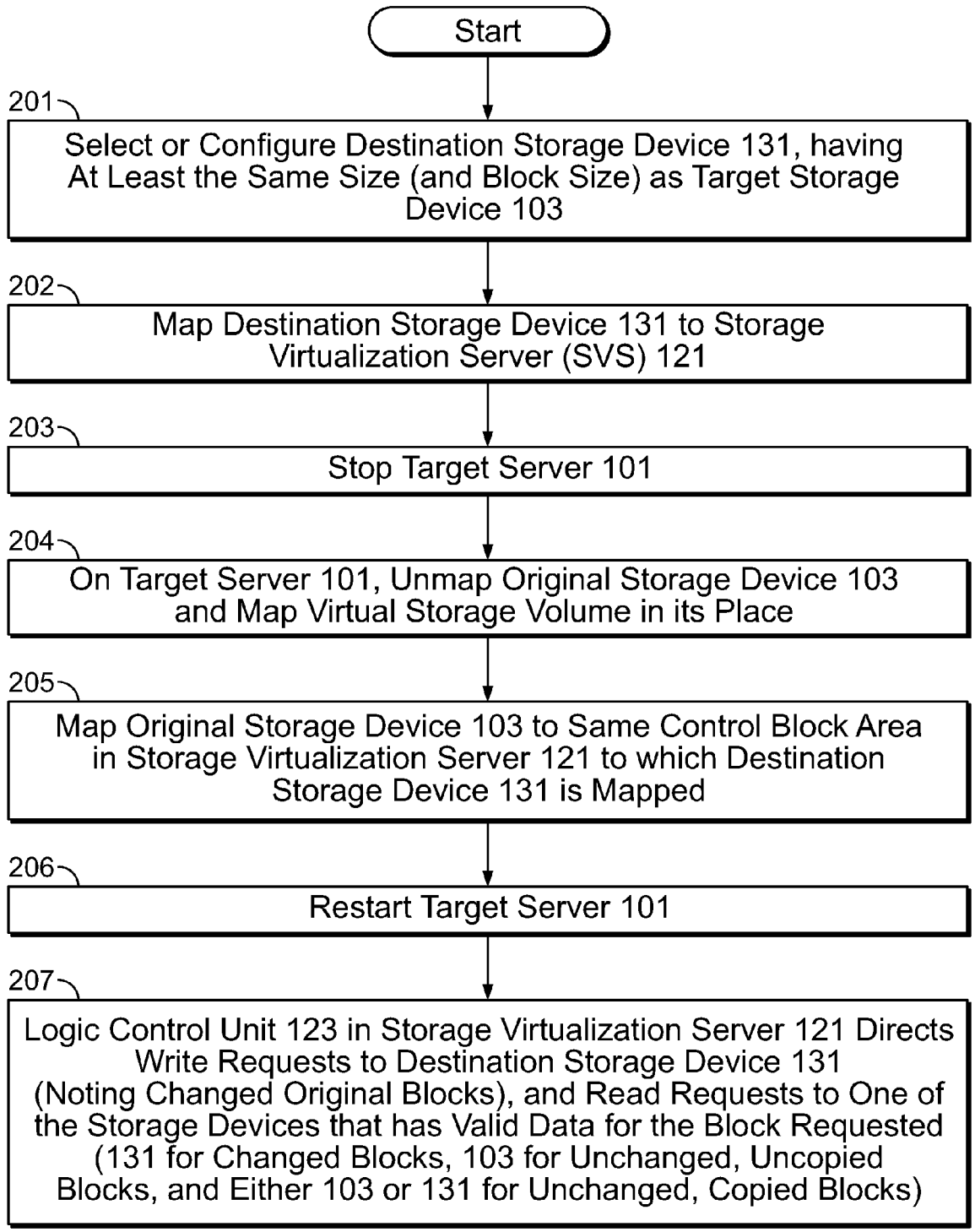
FIGS. 2A and 2B (together referred to as FIG. 2) contain a flow chart in two sections showing an exemplary set of operations as referred to above in connection with the system depicted in FIG. 1.
Figure 2B:
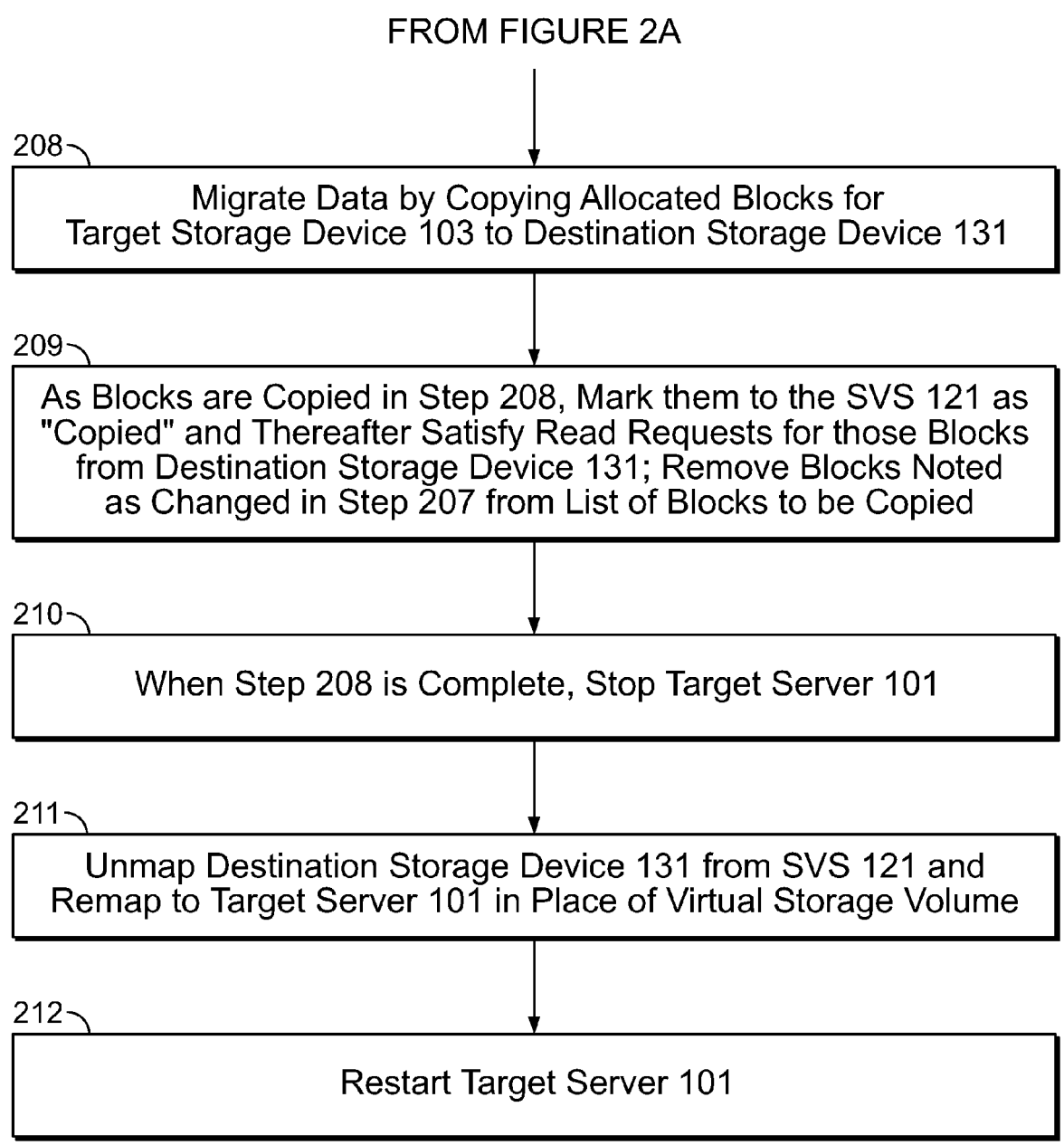

The operation of one aspect of the invention is illustrated by the block diagram of FIG. 1, taken in conjunction with the flow chart of FIG. 2.

Target server 101 is an operating server, which is connected to original storage unit 103 through interface 102. Storage device 103 may contain data for a database, or any other data store for Server 101. Interface 102 is schematically shown as switchable among positions 1, 2 and 3. In practice, the switching may be implemented by manual selection through a software interface, e.g., at the operating system level, with the command "Map [or Disconnect] Network Drive" (or equivalent "mount" or other command line command). The interface between target system 101 and its storage units may be any data interface, including without limitation a disk controller interface to a local drive, an interface over a storage bus, a remote interface, iSCSI, or other interface. Preferably, the data storage interfaces for use with the present invention, whether local or remote, will provide block level access to the supported storage units.

Assume it is desired to migrate target server 101 from storage device 103 (original storage unit) to storage device 131 (destination storage unit). Referring to the flow chart in FIG. 2, the following illustrative steps might be taken:

Step 201: Destination storage unit 131 is selected or configured to be the same size as original storage unit 103, or larger, if so desired, as well as the same block size.

Step 202: Destination storage unit 131 is mapped to storage virtualization server 121, through control block area 122 of the storage virtualization server, which is established to correspond to a virtual device of the same (or larger) size, and having the same block size as, original storage unit 103, as well as destination storage unit 131 (i.e., the destination storage unit 131 and virtual storage device 122 should be of at least the same size as the original storage unit 103, and have the same block size).

Note that the method disclosed herein is by no means limited to using a destination storage device of the same size as original storage device 103. If the virtual and/or destination storage devices have more blocks than original storage device 103, the storage virtualization server 121 will map and address only the number of blocks that are on original storage device 103. However, the remaining blocks on destination storage device 131 can still be used by other processes. In particular, after migration, destination storage device 131, with the migrated data now occupying a portion of its storage area, can be mounted and used in production in its full capacity, thereby expanding storage capacity by however much as may be desired. Additionally, various resizing, allocation and partitioning techniques may thereafter be used as well to expand or adapt storage.

Note also that storage virtualization server 121 is preferably a server established by running a piece of software, which may or may not be installed on dedicated hardware. A separate server can optionally be used to host virtualization server 121 for increased performance. However, the software can be run on any processor with a direct or network connection to target server 101, including on target server 101 itself, on a standalone server as depicted as element 121 in FIG. 1, or any other processor from which target server 101 is accessible. Thus, while element 121 is shown in FIG. 1 as a separate element, it should be understood that storage virtualization server 121 could equally well be implemented as a software service installed on target server 101. In a preferred embodiment, storage virtualization server 121 presents an iSCSI interface to systems wishing to utilize its storage services, which supports remote as well as local connections. Connections 106, 109, 110 and 111 can be any type of electrical, network, or other connection or interface over which data may be communicated with a storage device.

Furthermore, it should also be clear that destination storage unit 131 can be any type of storage unit that can be mounted by storage virtualization server 121, which could include directly connected physical disks, as well as SAN and other virtual volumes.

Step 203: If necessary in order to perform step 204 below, target server 101 is stopped. This may or may not also involve stopping the host machine that target server 101 runs on; for purposes of illustration it is assumed that target system 101 is implemented as a software process, and that the host machine and its operating system will continue running while target server 101 is stopped.

Step 204: Storage interface 102 on target server 101 is switched (or re-mapped) from original storage unit 103 to storage virtualization server 121.

Step 205: Original storage unit 103 is also mapped to storage virtualization server 121, through the same control block area 122 to which destination storage unit 131 was mapped. The volume provided by storage virtualization server 121 now appears on the host machine for target server 101 in the place of original storage unit 103.

Step 206: Target server 101 is restarted (if it was stopped).

Step 207: During the migration process, logic unit 123 in storage virtualization server 121 services read and write I/O requests from target server 101, over connection 106, for data that target server 101 had previously associated with original storage device 103. Logic unit 123 handles I/O requests from target server 101 as follows:

Write requests, for example, a request to write for block 126, are directed to destination storage unit 131. (It should be noted that a write request could either be to change allocated data or write data to a previously unallocated block.)

Read requests can be fulfilled from whichever source is valid for the block requested. For blocks that have not been changed during the migration process, for example, block 125 (assuming it had not been changed), this could be from original storage device 103. If the requested block has already been copied (per step 208 below), but not changed, it could be read from either original storage device 103 or destination storage device 131, in accordance with design or use preferences. Read requests for those blocks that have been written during the migration process, e.g., a subsequent read request for block 126 (or, in some embodiments, a read request for a block that has been copied per step 208 below), are fulfilled from destination storage device 131.

Logic unit 123 notes each block written during the migration process. It may in addition note each block copied per step 208. In a further embodiment, logic unit 123 may use a table, bitmap or other suitable structure having a flag or bit for each block, which is initially set to "0" or false, and marked "1" or true when the block is either written per step 207 or copied per step 208. In the latter embodiment, if the flag is raised for a block, that block, if requested for read operation, will be retrieved from destination storage device 131, and otherwise (i.e., if the flag is not raised) from original storage device 103.

Note that in effect control block area 122 is a "dual ported" data structure commonly associated with both the target and destination storage units having the same block size, and addressing the same number of blocks, as in original storage device 103, under the control of logic unit 123, in which read and write requests for individual blocks can be selectively directed to either original storage unit 103 or destination storage unit 131, as the logic dictates. This control may be achieved, for example, by driver software residing on storage virtualization server 121. While control block area 122 will address the same number of blocks as in target storage device 103, the destination storage device 131 can of course have any greater number of blocks beyond those so addressed. Writing such a driver is well within the skill of ordinarily skilled practitioners in the system programming field, given the teachings contained in this specification.

Step 208: Unchanged data blocks are copied from original storage unit 103 to destination storage unit 131. This copying may be begun at the same time as step 207 is begun, and performed concurrently, or begun at any later time, depending on user preferences and requirements, such as a preference to defer copying for performance reasons to a period of lower I/O demand. The copying may be performed in a separate process also run on storage virtualization server 123, or alternately, on any machine connected to the target and destination devices. The data may be copied at a block level, based on a list of allocated blocks on original storage unit 103 (or a list of all blocks in which allocated blocks have been noted); blocks can be removed from this list when written per step 207, so that old data is not copied over updated data. A table or bitmap, such as that described in connection with step 207 may also be used to guide this process. In one embodiment, the same table or bitmap could be used, copying those blocks for which the flag is still set to zero (i.e., blocks not changed or previously copied).

In an embodiment as described above, as existing blocks on original storage unit 103 are modified, they are removed from the list of blocks to be copied in step 208. Thus, in the case of a 5 TB original disk with only 2TB of used space, the migration step is started with only 2TB of blocks to move, which will typically decrease as the running application keeps on updating some blocks, making it unnecessary to move them—thereby speeding up the migration.

Step 210: When the copying of step 208 is completed, target server 101 may be stopped, if necessary, to perform step 211.

Step 211: Destination storage unit 131 is unmapped from storage virtualization server 121 and mapped to target server 101 (in place of the volume theretofore provided by storage virtualization server 121).

Step 212: Target server 101 is restarted (if necessary), and processing resumes, from destination storage unit 131.

It should be noted that steps 203-206 and 210-212, if needed, typically should only take a few minutes each, and can be run at scheduled maintenance times. Thus, the foregoing process meets the objective of providing a data migration mechanism that allows the affected server to remain substantially available for read-write operations during the period of migration. This process also meets the further objective of not requiring nonstandard software to be installed on the target server, or that any non-standard hardware be left connected to the target server after the migration. A separate server is not needed to perform the migration, but may be provided to host storage virtualization server 121 for increased performance. In the event it is desired that the destination storage unit be larger than the original storage unit, this may be easily achieved by resizing, for example, under the control of a logical volume manager, as is familiar and well known to ordinary skilled system administrators. Furthermore, it is not necessary to wait for the migration to finish before using destination storage device 131; new data written is directed to destination storage device 131 as soon as it is brought up through storage virtualization server 121 and connected to target server 101.

Example 1

Figure 3:
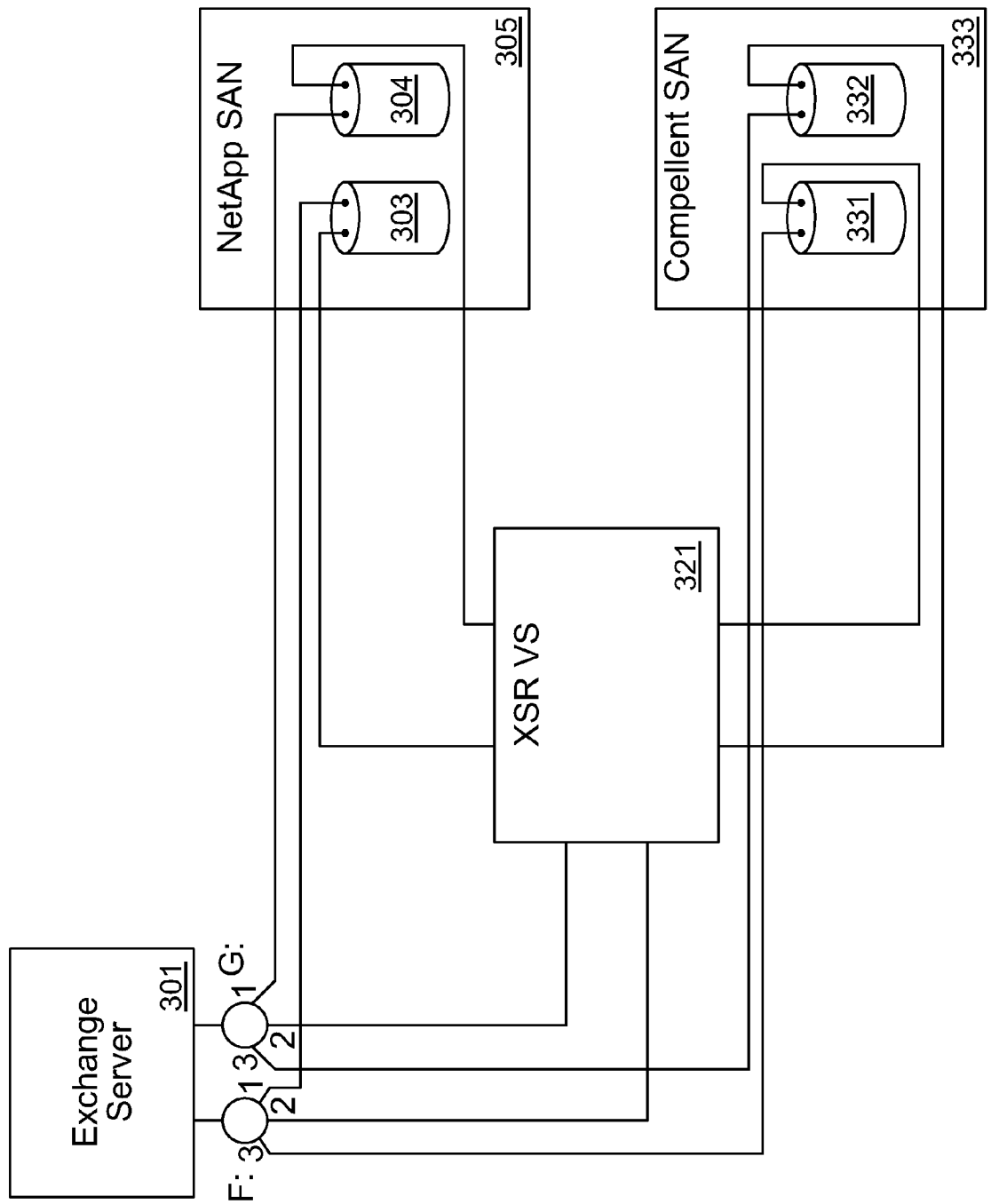
FIG. 3 is a block diagram schematically illustrating the test system used in the example described in the accompanying description.

The following test was performed, involving the migration of a Microsoft® Exchange® 2007 server from NetApp to Compellant® SAN storage, using a system as schematically illustrated in FIG. 3:

Test machine 301 was a blade server at address 71.100.160.101 running Exchange 2007. Drives F: and G: on test machine 301 were for the Exchange log volume and database volume, respectively sized at 4 G and 20 G, and iSCSI mapped from volumes 303 and 304 on a NetApp f270a SAN 305.

Two drives, 331 and 332, on Compellant SAN 333, with the same sizes and block sizes as the NetApp volumes, were created and mapped to a storage virtualization server (SVS) 321. SVS server 321 was loaded with a custom driver to set up a common, same-sized, control block area for each pair of target and destination drives, and to handle reads and writes, as described in steps 207 and 209 above. Note that while Compellant drives 331 and 332 were in this example the same 4 G and 20 G sizes as the original Exchange Server drives F: and G:, they could have been any larger size.

The Exchange server on test machine 301 was stopped; drives F: and G: were disconnected (unmapped) from the NetApp volumes, and mapped instead to the volumes created on the SVS server.

Virtual LUNs were created on the SVS server 321 using the NetApp volumes 303, 304 as the respective base files, and the Compellant volumes 331, 332 as LUN files, and these were mapped to test machine 301. LUNs from the SVS server 321 appeared on the test machine 301 with the same drive letters, F: and G:.

The Exchange server on test machine 301 was restarted, and operations resumed from Compellant volumes 331 and 332.

Data migration (block copying from devices 303 and 304 to devices 331, 332 (respectively), was started in the background (with the list of blocks to be copied initialized and managed in accordance with steps 207-209 above).

When the data copying was finished, the Exchange server was stopped. The Compellant volumes 331 and 332 were unmapped from SVS server 321 and mapped to test machine 301.

The Exchange server on test machine 301 was restarted.

The migration demonstrated in this example was achieved with no loss of data integrity and was performed with down time of only a few minutes to start and restart the Exchange server and map and unmap drives. The server was operational, available, and online for normal operation during the entire time it took to migrate the actual data. This represents a dramatic advantage over the prior art, in which such a migration—a complete change of SANs—would ordinarily take many hours, during which the server would be unavailable.

Commercially, software might be distributed and licensed to adapt a storage virtualization server to perform the operations of that server described above, and to help automate those operations. Such software could be provided in the form of a driver for use in the storage virtualization server, or a package including such a driver. Using the software might involve:

selecting or configuring a destination storage unit (the software could ensure that the destination storage unit was properly configured and had at least the same size and the same block size as the original storage unit);

instructing the storage virtualization server to map both the original storage unit, and the destination storage unit, to a virtual storage device provided by the operation of the software;

stopping the target system;

substituting the virtual storage device for the original storage unit on the target system;

restarting the target system, whereupon the applicable software components will cause the virtual storage device to service I/O requests in accordance with the methods described above, and to copy the data in bulk at such time as the user may specify;

when data copying is complete, stopping the target system;

unmapping the destination storage unit from the storage virtualization server and substituting the destination storage unit for the virtual storage device on the target system; and restarting the target system.

A script, graphical user interface (GUI), or "software wizard" could be provided in connection with the software to guide the user through these steps, or alternatively, incorporate machine-executable instructions for automating the entire process.

The methods taught herein have a wide range of application. Essentially, they may be used to substantially improve server availability during data migration, in virtually any type of high-availability server application having a large data store. Among the advantages provided by the invention are: (1) there is minimal down time for the application; (2) no additional hardware is needed either during or after migration (although as mentioned the user may use an additional server to host volume virtualization for improved performance; and (3) there is no need to wait for the migration to finish to be able to use the new storage device.

Although the present invention has been described in detail, it should be understood that various changes, substitutions, and alterations may be readily ascertainable by those skilled in the art and may be made herein without departing from the spirit and scope of the present invention as defined by the claims.

I claim:

1. A method for performing a migration to a destination storage unit, of the data on an original storage unit for a target system that remains substantially available for read and write operations while the migration is being effected, wherein the original storage unit has a size and a block size, comprising:
    (a) selecting or configuring the destination storage unit to have a size at least as large as the size of the original storage unit and to have a block size equal to the block size of the original storage unit;
    (b) providing a virtual storage device having a size at least as large as the size of the original storage unit, a block size equal to the block size of the original storage unit, and a control block mappable to two storage units;
    (c) stopping the target system, and thereafter:
    (d) substituting the virtual storage device for the original storage unit on the target system,
    (e) mapping the control block of the virtual storage device to both the original and the destination storage units, and
    (f) restarting the target system;
    (g) maintaining at the virtual storage device a flag for each of a plurality of data blocks associated by the target system with the original storage unit;
    (h) receiving I/O requests at the virtual storage device, the I/O requests comprising block write requests and block read requests;
    (i) directing each block write request to the destination storage unit instead of the original storage unit and setting the flag for each block written;
    (j) directing each block read request to the original storage unit if the flag for the requested block is not set, and otherwise to the destination storage unit;
    (k) concurrently with the receiving I/O requests step, copying only allocated data blocks whose flags are not set from the original storage unit to the destination storage unit and setting the flag for each block copied;
    (l) after completion of the copying step: stopping the target system,
    (m) substituting the destination storage unit for the virtual storage device on the target system by unmapping the control block of the virtual storage device from the destination storage unit and mapping the destination storage unit to the target system, and
    (n) restarting the target system.

2. The method of claim 1, wherein said copying step comprises copying blocks listed in a list.

3. The method of claim 2, wherein the original storage unit has one or more allocated blocks and said list is initially limited to the allocated blocks of the original storage unit.

4. The method of claim 3, wherein said list is incorporated in a machine-readable data structure in which is recorded blocks allocated, blocks written and blocks copied.

5. The method of claim 2, further comprising removing from said list each block on said list not yet copied that has been written to.

6. The method of claim 1, wherein:
substituting the virtual storage device for the original storage unit on the target system comprises switching an interface from a first position to a second position; and
substituting the destination storage unit for the virtual storage device on the target system comprises switching the interface from the second position to a third position.

7. The method of claim 1, wherein:
providing the virtual storage device comprises providing a storage virtualization server; and
substituting the virtual storage device for the original storage unit on the target system comprises connecting the target system to the storage virtualization server.

8. A non-transitory machine-readable medium containing a computer program, for use in migrating data on an original storage unit for a target system to a destination storage unit, wherein the original storage unit has a size and a block size, said program comprising a series of machine-executable instructions for performing steps comprising:
(a) selecting or configuring the destination storage unit to have a size at least as large as the size of the original storage unit and to have a block size equal to the block size of the original storage unit;
(b) providing a virtual storage device having a size at least as large as the size of the original storage unit, a block size equal to the block size of the original storage unit, and a control block mappable to two storage units;
(c) stopping the target system, and thereafter:
(d) causing the storage virtualization server to map both the original storage unit, and the destination storage unit, to a virtual storage device provided by the operation of the software,
(e) substituting the virtual storage device for the original storage unit on the target system, and
(f) restarting the target system, thereby allowing the software to service I/O requests for data blocks associated by the target system with the original storage unit, and to copy unchanged data blocks from the original storage unit to the destination storage unit;
(g) maintaining a flag for each of a plurality of data blocks associated by the target system with the original storage unit;
(h) receiving I/O requests, the I/O requests comprising block write requests and block read requests;
(i) directing the block write requests to the destination storage unit instead of the original storage unit and setting the flag for each block written;
(j) directing each block read request to the original storage unit if the flag for the requested block is not set, and otherwise to the destination storage unit;
(k) concurrently with the receiving I/O requests step, copying only allocated data blocks whose flags are not set from the original storage unit to the destination storage unit and setting the flag for each block copied;
(l) after completion of the copying step: stopping the target system,
(m) substituting the destination storage unit for the virtual storage device on the target system by unmapping the control block of the virtual storage device from the destination storage unit and mapping the destination storage unit to the target system, and
(n) restarting the target system.

9. The non-transitory machine-readable medium of claim 8, wherein said computer program is provided in the form of a virtual storage driver for operation on a storage virtualization server.

10. The method of claim 8, wherein:
substituting the virtual storage device for the original storage unit on the target system comprises switching an interface from a first position to a second position; and
substituting the destination storage unit for the virtual storage device on the target system comprises switching the interface from the second position to a third position.

11. The method of claim 8, wherein:
providing the virtual storage device comprises providing a storage virtualization server; and
substituting the virtual storage device for the original storage unit on the target system comprises connecting the target system to the storage virtualization server.

12. A method whereby a user can use software provided by a supplier to migrate data on an original storage unit for a target system, to a destination storage unit, wherein the original storage unit has a size and a block size, said software providing facilities for creating a virtual storage device having a size at least as large as the size of the original storage unit, a block size equal to the block size of the original storage unit, and a control block area that may be mapped to both the original storage unit and the destination storage unit, and containing machine-executable instructions for maintaining a flag for each of a plurality of data blocks associated by the target system with the original storage unit, directing each block write request to the destination storage unit instead of the original storage unit and setting the flag for each block written, directing each block read request to the original storage unit if the flag for the requested block is not set, and otherwise to the destination storage unit, and copying only allocated data blocks whose flags are not set from the original storage unit to the destination storage unit and setting the flag for each block copied, said method comprising:
(a) installing software from the machine readable medium on or in connection with a storage virtualization server;
(b) selecting or configuring the destination storage unit to have a size at least as large as the size of the original storage unit and to have a block size equal to the block size of the original storage unit;
(c) causing the storage virtualization server to map both the original storage unit, and the destination storage unit, to a virtual storage device provided by the operation of the software;
(d) stopping the target system, and thereafter:
(e) substituting the virtual storage device for the original storage unit on the target system,
(f) mapping the control block of the virtual storage device to both the original and the destination storage units, and
(g) restarting the target system, thereby allowing the software to service I/O requests for data blocks associated by the target system with the original storage unit, and to copy unchanged data blocks from the original storage unit to the destination storage unit;
(h) maintaining a flag for each of a plurality of data blocks associated by the target system with the original storage unit;
(i) receiving I/O requests, the I/O requests comprising block write requests and block read requests;

(j) directing the block write requests to the destination storage unit instead of the original storage unit and setting the flag for each block written;
(k) directing each block read request to the original storage unit if the flag for the requested block is not set, and otherwise to the destination storage unit;
(l) concurrently with the receiving I/O requests step, copying only allocated data blocks whose flags are not set from the original storage unit to the destination storage unit and setting the flag for each block copied;
(m) after completion of the copying step: stopping the target system,
(n) substituting the destination storage unit for the virtual storage device on the target system by unmapping the control block of the virtual storage device from the destination storage unit and mapping the destination storage unit to the target system, and
(o) restarting the target system.

13. The method of claim 12, wherein:
substituting the virtual storage device for the original storage unit on the target system comprises switching an interface from a first position to a second position; and
substituting the destination storage unit for the virtual storage device on the target system comprises switching the interface from the second position to a third position.

14. The method of claim 12, wherein:
providing the virtual storage device comprises providing a storage virtualization server; and
substituting the virtual storage device for the original storage unit on the target system comprises connecting the target system to the storage virtualization server.

* * * * *